Figure 7:
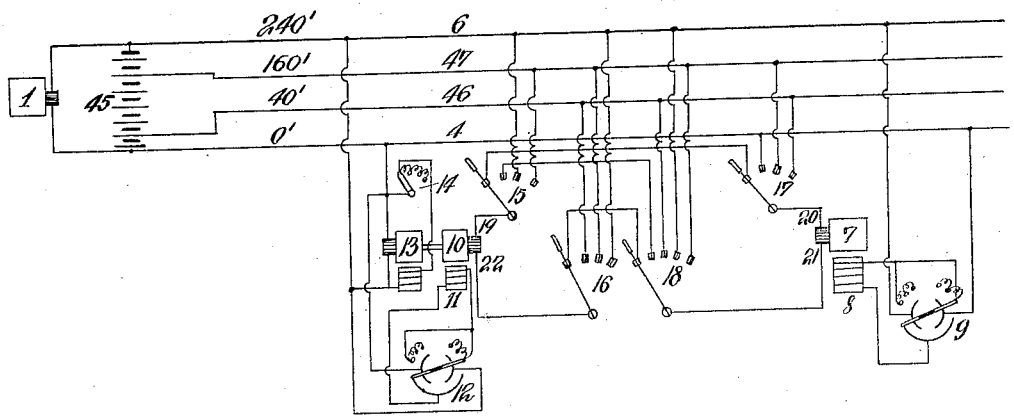

H. W. LEONARD.
METHOD AND MEANS FOR CONTROL OF ELECTRIC ENERGY.
APPLICATION FILED DEC. 7, 1905.
1,003,925.
Patented Sept. 19, 1911.
10 SHEETS—SHEET 1.
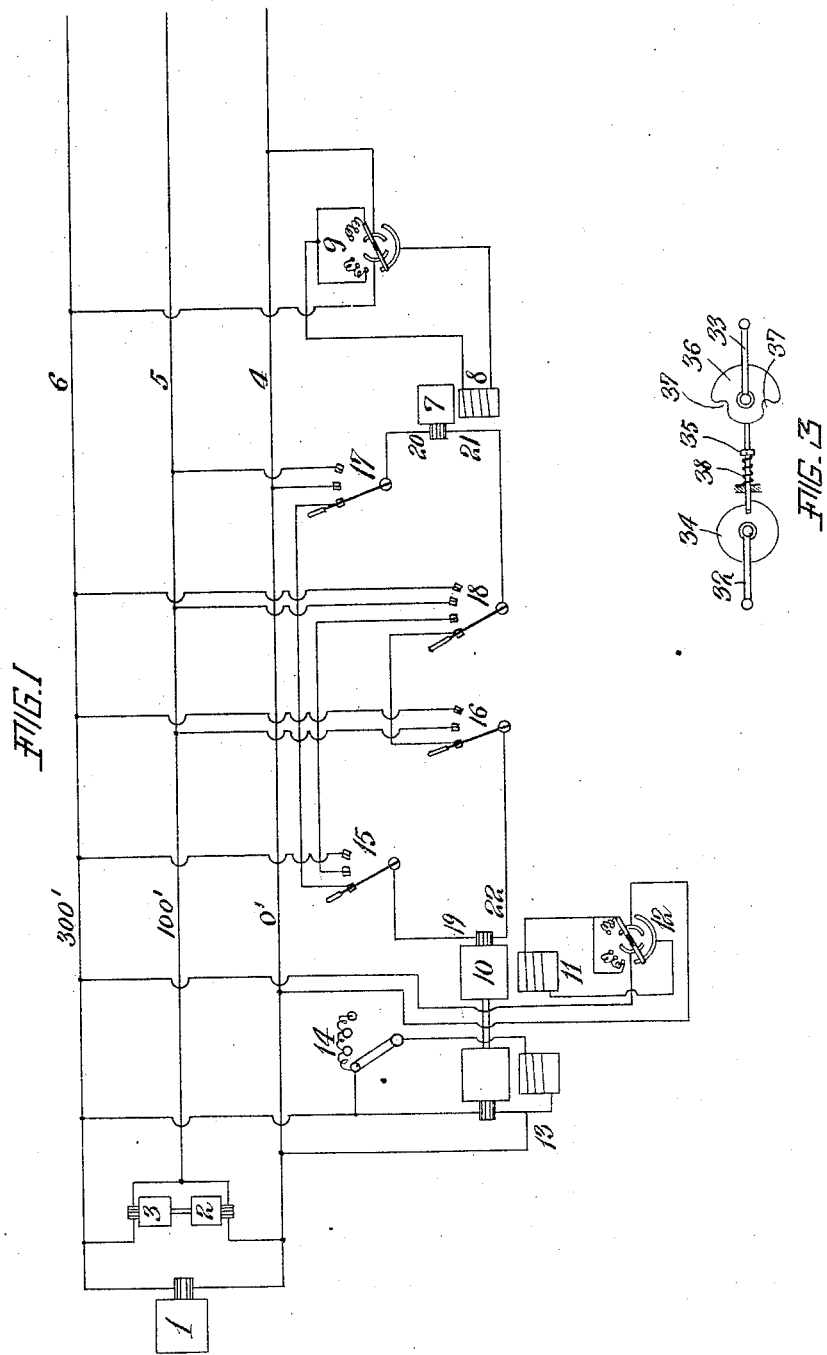

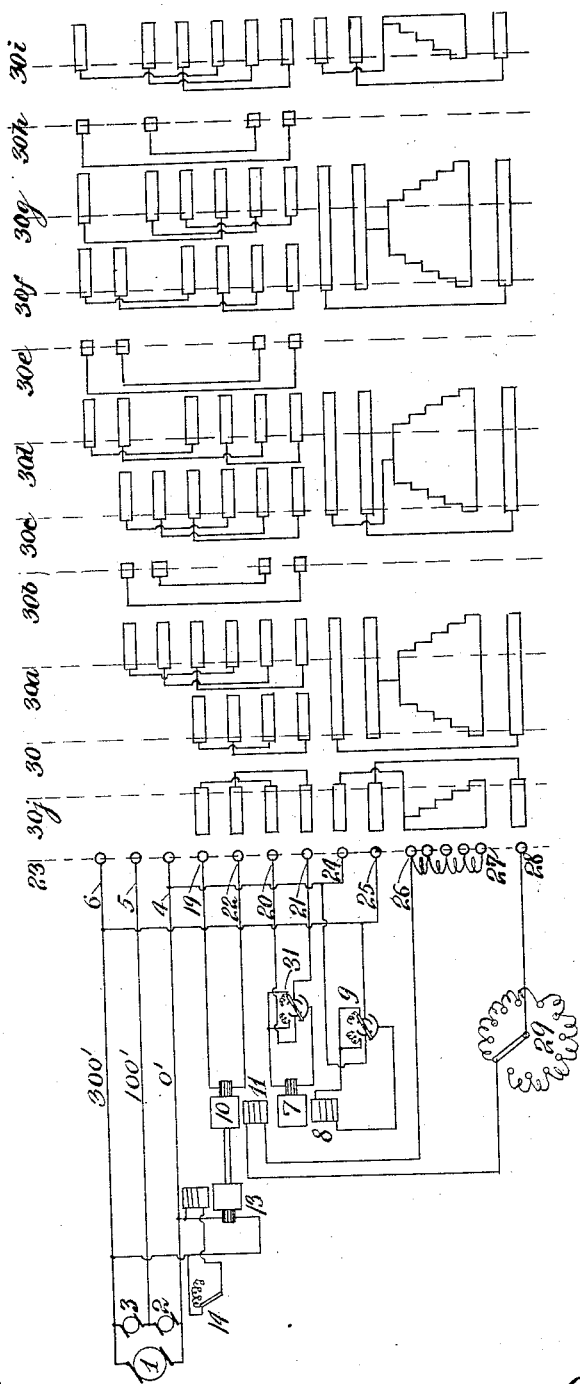

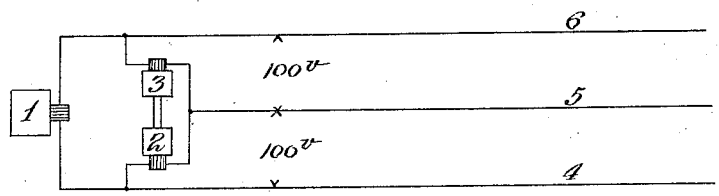
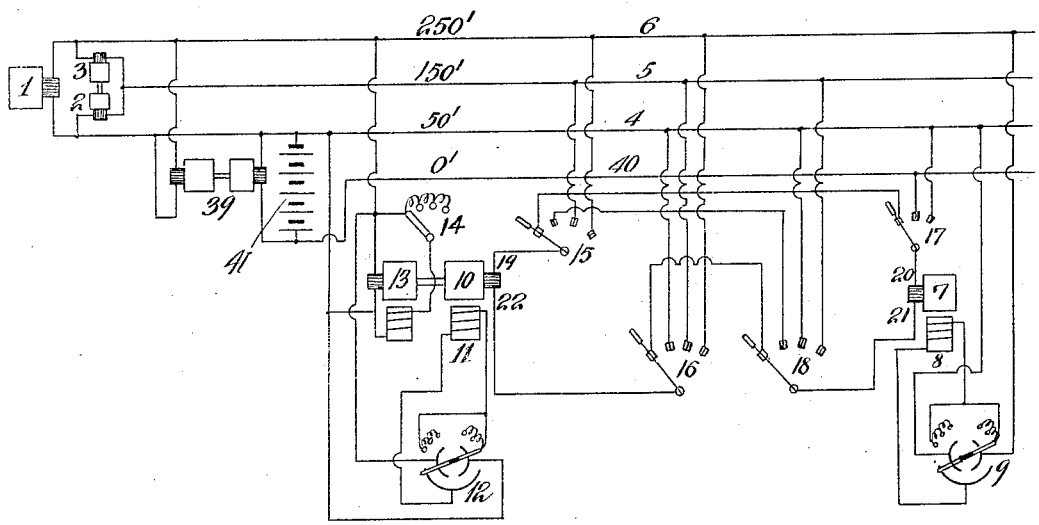

H. W. LEONARD.
METHOD AND MEANS FOR CONTROL OF ELECTRIC ENERGY.
APPLICATION FILED DEC. 7, 1905.

1,003,925.

Patented Sept. 19, 1911.
10 SHEETS—SHEET 4.

Witnesses
S. K. Sager.
Boau Konigsberg

Inventor
H. Ward Leonard
By his Attorney
C. W. Edwards.

H. W. LEONARD.
METHOD AND MEANS FOR CONTROL OF ELECTRIC ENERGY.
APPLICATION FILED DEC. 7, 1905.

1,003,925.

Patented Sept. 19, 1911.
10 SHEETS—SHEET 5.

Witnesses
L. H. Sager
Frank Konigsberg

H. Ward Leonard Inventor
By his Attorney
C. W. Edwards

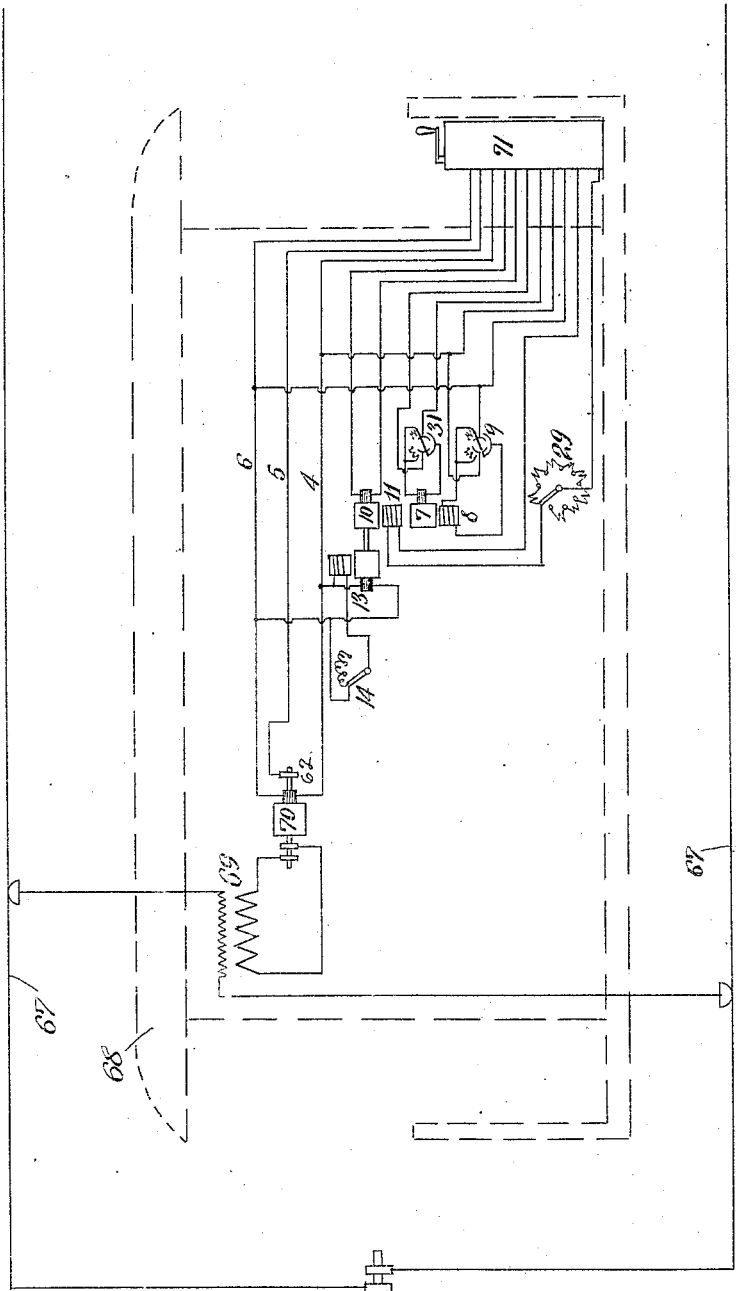

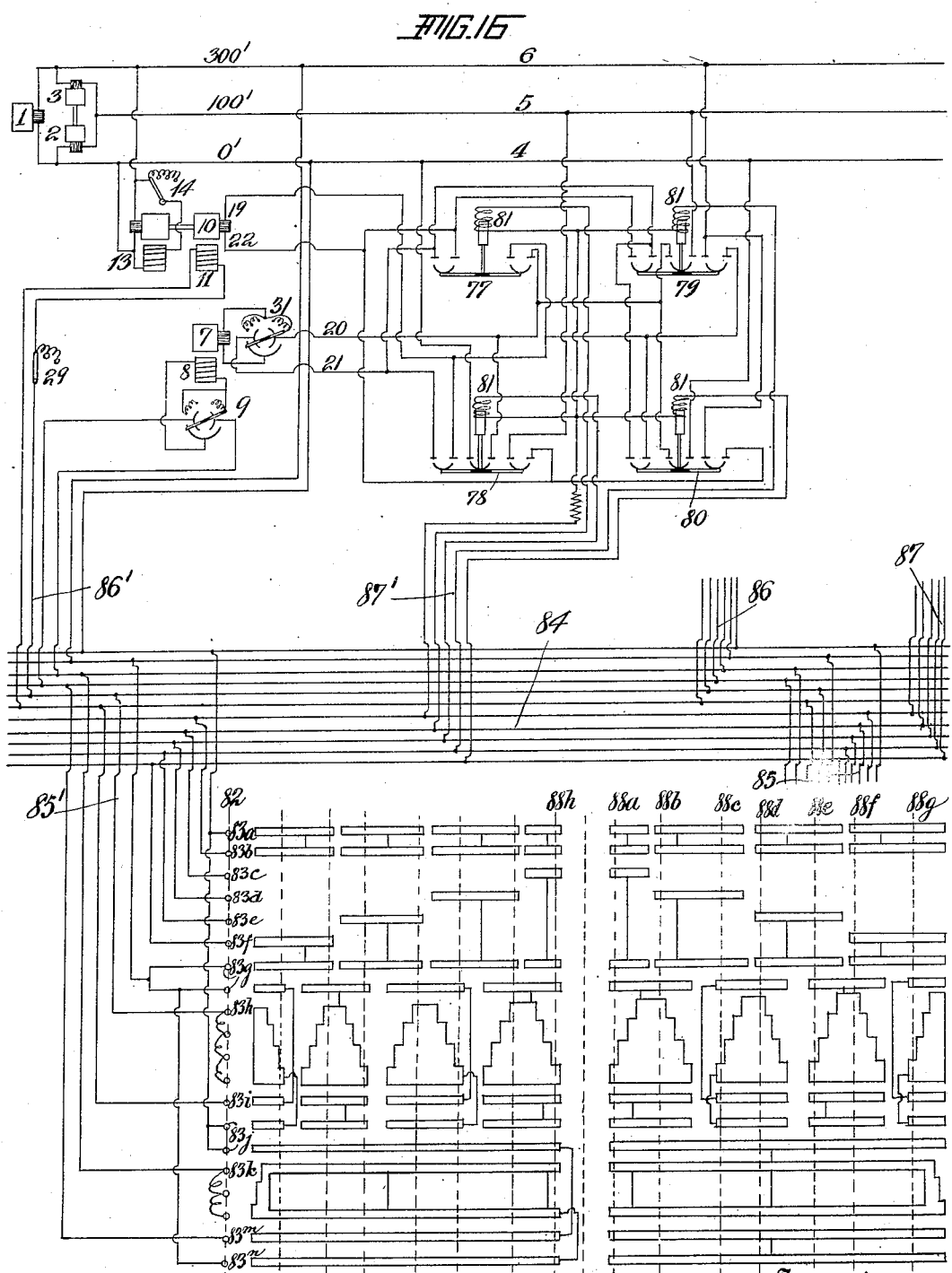

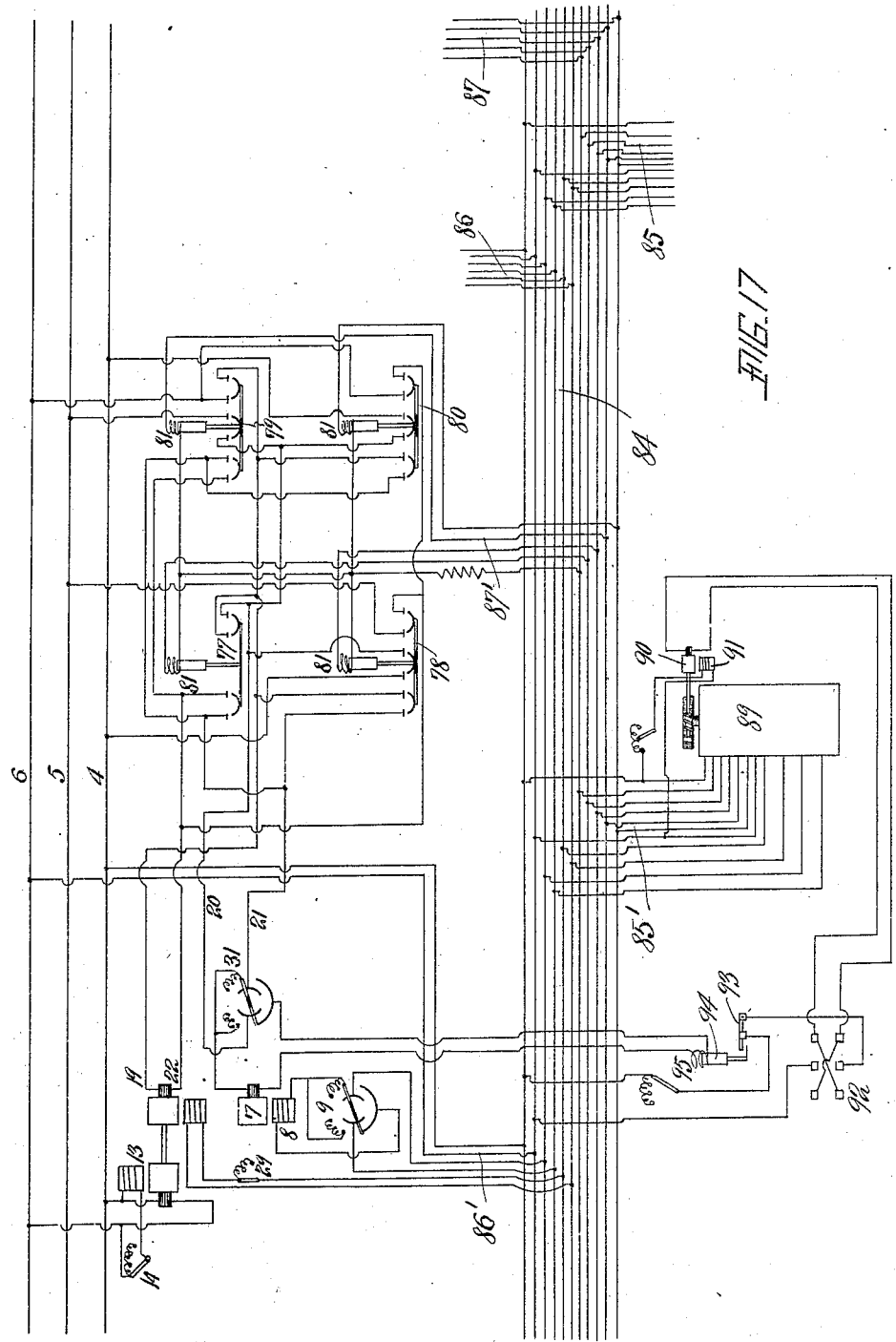

H. W. LEONARD.
METHOD AND MEANS FOR CONTROL OF ELECTRIC ENERGY.
APPLICATION FILED DEC. 7, 1905.

H. W. LEONARD.
METHOD AND MEANS FOR CONTROL OF ELECTRIC ENERGY.
APPLICATION FILED DEC. 7, 1905.

1,003,925.

Patented Sept. 19, 1911.
10 SHEETS—SHEET 10.

Witnesses
L. H. Sager.
Frank Konigsberg.

H. Ward Leonard, Inventor
By his Attorney C. W. Edwards

UNITED STATES PATENT OFFICE.

HARRY WARD LEONARD, OF BRONXVILLE, NEW YORK.

METHOD AND MEANS FOR CONTROL OF ELECTRIC ENERGY.

1,003,925.   Specification of Letters Patent.   Patented Sept. 19, 1911.

Application filed December 7, 1905. Serial No. 290,683.

*To all whom it may concern:*

Be it known that I, HARRY WARD LEONARD, a citizen of the United States, residing at Bronxville, in the county of Westchester and State of New York, have invented certain new and useful Improvements in Methods and Means for Control of Electric Energy, of which the following is a full, clear, and exact specification.

My invention relates to the control of electrical energy, and an important application is the speed control of electric motors, although it is useful for the control of many other forms of translating devices, such as storage batteries, electric furnaces, electric lights, transformers and other devices.

Among the objects of my invention are the improvement of the control of the electric energy received or delivered by such devices, the reduction of size, first cost and depreciation of the installation required and the improvement in the efficiency and reliability of the installation.

The importance of voltage control for electric motors in order to vary their speed as distinguished from ohmic control is now well understood.

In my pending application Serial No. 269,331, filed July 12, 1905, I have described a method and means by which a variable and reversible electromotive force is employed in connection with a supply system so as to very materially decrease the cost and size of the regulating apparatus and in which the efficiency is considerably increased; in the form described the watt capacity of the regulating and controlling apparatus under the conditions assumed and with a three-wire system being one third of that of the motor controlled.

By my present invention I further reduce the size and cost of the regulating and controlling devices. The reduction in first cost, conversion losses, size and weight together with other advantages obtained make my present method and system of control a very desirable one, particularly for controlling motors in factories, electric elevators, printing establishments, installations on shipboard, traveling cranes, mining installations, railway trains, storage battery installations, and in fact in any case where refinement of control, efficiency, freedom from depreciation, reduced first cost, or reliability of service are to be considered important factors.

My invention is especially well adapted to existing types of continuous current motors, but is also applicable and desirable for systems employing current of alternating, pulsating or interrupted form. It also presents many advantages when the source of electrical energy supplied is in the form of continuous or alternating current and where it may be desirable to employ motors requiring a current differing in some characteristics from the current supplied by the source. It also has advantages for motors which are to be used with different forms of energy supplied under different conditions, such as in railway operations where the character of the supply system is changed in passing through different sections.

My invention has various applications not referred to specifically herein and is capable of being practiced in different ways and embodied in constructions which may differ widely from each other. I am therefore limited in the scope thereof only as indicated by the appended claims.

My invention will be understood from the following description read in connection with the accompanying drawings.

Figure 8:
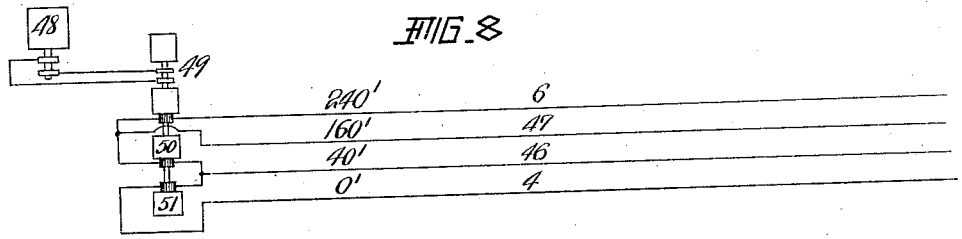
Figure 9:
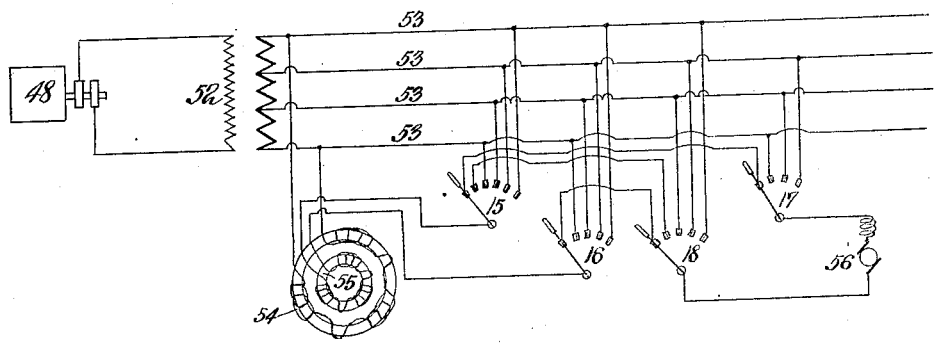
Figure 10:
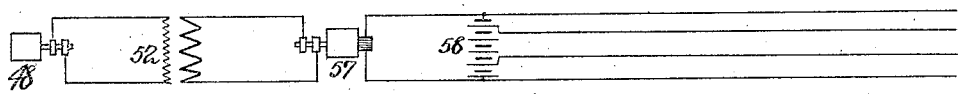
Figure 11:
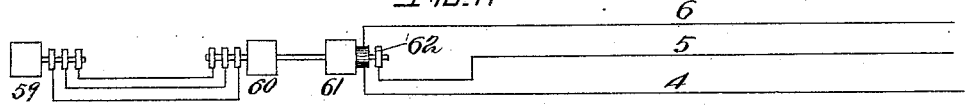
Figure 12:
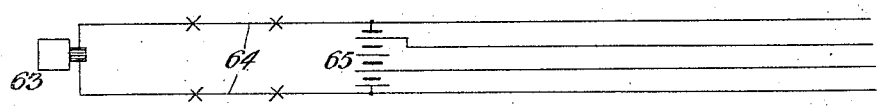
Figure 14:
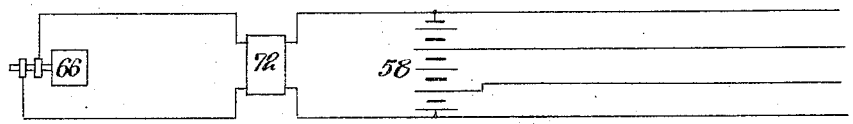
Figure 15:
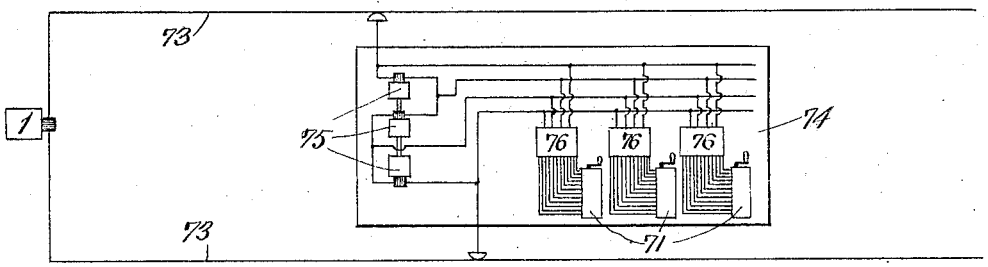
Figure 18:
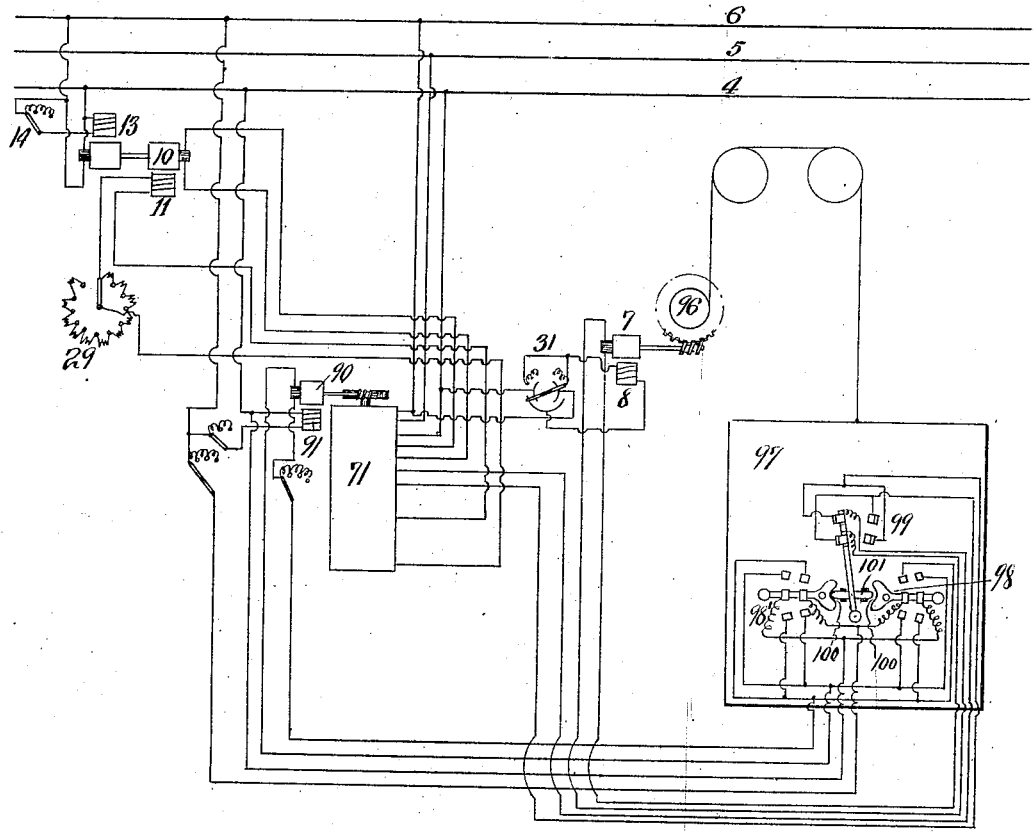
Figure 19:
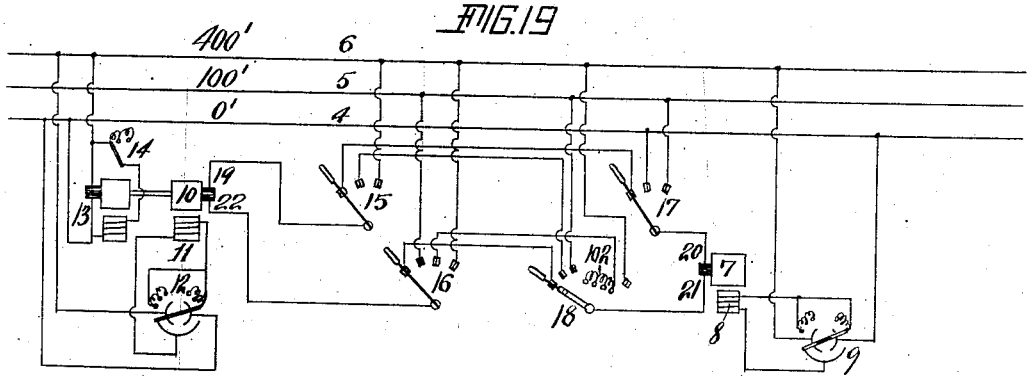
Figure 20:
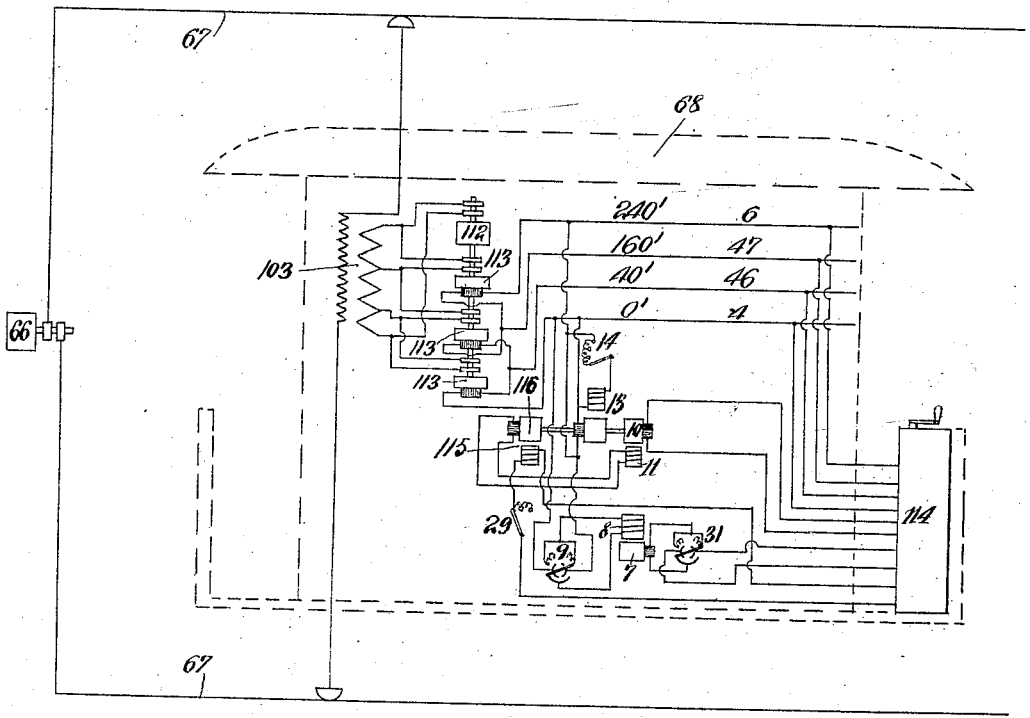
Figure 21:
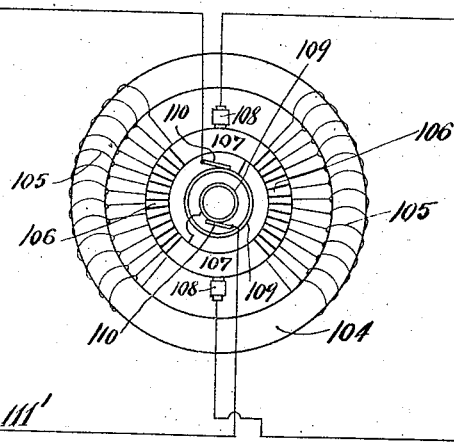

Figure 1 is a diagram of apparatus and connections for practicing my invention in one form; Fig. 2 is a diagram of connections and development of a drum controller for carrying out the method of operation described with reference to Fig. 1; Fig. 3 is a plan view illustrating one form of interlocking means for the controlling and reversing switch; Fig. 4 is a diagram indicating a three-wire supply system with the voltages between the intermediate and outside conductors equal; Fig. 5 is a diagram of apparatus and connections with a four-wire local system assuming certain values of the various voltages; Fig. 6 is a diagram for a five-wire local system with certain assumed values of voltages; Fig. 7 is a diagram with a four-wire supply system and certain assumed voltages; Fig. 8 is a diagram showing a different means for deriving the different electromotive forces from that shown in Fig. 7 and from an alternating current source; Fig. 9 shows in diagram an alternating current system to which my invention is applied; Fig. 10 is a diagram showing an alternating current source and means for deriving direct current for the multiple voltage supply mains; Fig. 11 shows in diagram a polyphase alternating current source and means for deriving direct current for the three-wire mains; Fig. 12 indicates a direct, constant current source with means for deriving multiple voltages for the multiple voltage mains; Fig. 13 is a diagram of a railway system to which my invention is applied; Fig. 14 indicates an alternating current source with means for conversion to direct current and for dividing the voltage; Fig. 15 is a diagram showing my invention applied to a crane; Fig. 16 is a diagram of apparatus and connections for remote and multiple unit control; Fig. 17 is a diagram of a system for remote control with automatic means for controlling the action; Fig. 18 is a diagram showing my invention applied to an elevator system with control of the apparatus from the car; and Fig. 19 is a diagram showing a three-wire supply and certain different voltages assumed; Figs. 20 and 21 are diagrams showing modifications of my invention.

Referring to Fig. 1, a main source of energy is indicated at 1, which in the present instance is assumed to be a source of direct current. Between the supply mains from this source are connected two dynamo electric machines 2, 3 and from the outside terminals and from the intermediate connection extend the three supply mains 4, 5 and 6. The machines 2, 3 are mechanically coupled and rotate at a constant speed operating to maintain constant potentials on the three supply mains in a manner now well understood. I have assumed that the electromotive force of machine 2 is 100 volts and that of machine 3 to be 200 volts, thus I have indicated the potential of line 4 as 0', that of line 5 as 100', and that of line 6 as 300'. The translating device to be controlled is shown as a motor having the armature 7 and field 8. The field 8 is connected across the outside supply mains through a reversing switch 9 by which the strength and polarity of the field may be controlled. The variable source of electromotive force is shown as a dynamo electric machine having the armature 10 and field 11, the latter being excited by windings connected across the outside mains through the controlling and reversing rheostat 12. The armature 10 is shown as being driven in the present instance by a motor 13, and a rheostat 14 is shown connected in the field circuit thereof for the purpose of varying its speed if desired. From the terminals of the armature 10 and armature 7 extend connections to a set of switches designated as 15, 16, 17 and 18.

By properly manipulating the various devices above described, any desired speed of the motor controlled may be obtained without the use of resistances in the armature circuit and solely by what may be termed voltage control. We may assume that the current capacity of the motor controlled and that of the variable source of electromotive force is the same, that the electromotive force of the armature 10 is 50 volts and that the maximum electromotive force of the armature 7 to be controlled is 350 volts. Under these conditions the watt capacity of the regulating and controlling means is only one-seventh of that of the motor controlled.

The mode of operation of Fig. 1 is as follows: The motor 13 may be assumed to run at a practically constant speed driving the armature 10 at constant speed in its variable and reversible field. The field 8 of the driven motor may be assumed to be constant, and in starting, the rheostat 12 will be in such a position that the field 11 has zero strength or is at a minimum strength. The terminals of the armatures 10 and 7 are designated for convenience by the numerals 19, 20, 21 and 22. The switches 15, 16, 17, and 18 are indicated as pivoted switches adapted to engage the clips of the contacts edgewise and to make engagement with any contacts desired without necessarily engaging intermediate contacts in passing to the new position. In starting, these switches engage contacts so that the armatures 10 and 7 are directly connected in a local loop, as in the position shown. A low voltage is thus applied to the armature 7 and by adjusting the rheostat 12, this voltage may be gradually increased to fifty volts, which is assumed to be the maximum voltage of armature 10. To increase the speed, the connections made by the armature switches are now changed so that the armatures 10 and 7 are connected in series between the mains 4 and 5. This is accomplished by moving switch 16 so as to connect terminal 22 to main 5, by moving switch 17 to connect terminal 20 to main 4 and by moving switches 15 and 18 to connect terminals 19 and 21. With the strength of field 11 still at its full value and in such a direction that the armature 10 generates an electromotive force counter to that of the mains 4, 5 the armature 7 will be subjected to a resultant electromotive force of fifty volts, it being the same value and in the same direction as when the armature 7 was previously connected in a local loop with armature 10. By now decreasing the strength of field 11 by means of the rheostat 12, the counter volts of armature 10 will be gradually decreased and the resultant electromotive force applied to the motor to be controlled will be gradually increased, and when the circuit of the field 11 is opened at the rheostat the counter volts will be zero and the armature 7 will receive the voltage between the mains 4, 5. The same speed of the motor controlled will be obtained by connecting the armature 7 directly across the mains 4, 5 as by changing switch 18 to connect terminal 21 to main 5. This is a desirable running position, as the controlling apparatus is cut out of circuit and the efficiency consequently increased. An increased voltage may now be applied to the armature 7 and consequently increase its speed by again connecting the armatures 10 and 7 in series between the mains 4, 5 as above described, and by reversing the excitation of field 11 and gradually increasing its strength by the rheostat 12. The electromotive force generated by armature 10 will now be in the same direction as that between mains 4, 5. The electromotive force supplied to the armature 7 may therefore be increased to 150 volts with these connections, the 50 volts of armature 10 being added to that of the mains 4, 5. Further increase is next secured by connecting the armatures 10 and 7 in series between the mains 5, 6 the armature 10 being connected in such a direction that its electromotive force opposes that of the mains.

As the electromotive force between the mains 5, 6 is 200 volts and as the armature 10 is generating in its full field an opposing electromotive force of 50 volts, the resultant electromotive force applied to the armature will be 150. To secure this result terminal 19 is connected by switch 15 to line 6. Terminal 22 is connected by switches 16 and 18 to terminal 21 and terminal 20 is connected by switch 17 to line 5, the field 11 remaining at its full strength as before. By gradually weakening the field 11, the counter electromotive force of armature 10 is gradually reduced to zero and the armature 7 will then receive 200 volts. The same result may be secured by connecting the armature 7 directly between the mains 5, 6 by means of switches 17, 18, connecting terminal 20 to line 5 and terminal 21 to line 6. This cuts out of circuit the controlling device and is therefore a desirable running position. To further increase the electromotive force applied to armature 7, the two armatures will again be connected in series as before between the mains 5, 6 and by reversing the field 11 and gradually increasing its strength, the electromotive force applied to the motor will be that of the mains 5, 6 plus the voltage of armature 10, or 250 volts. Now, while maintaining the field 11 at its full strength, the connections of the armatures may be changed so as to connect them in series across the mains 4, 6 and in such a direction that the electromotive force of armature 10 opposes that of the mains 4, 6. This result is attained by connecting terminal 20 to line 4, terminal 22 to line 6, and connecting terminals 19, and 21 to each other. Weakening the field 11 will now decrease the counter volts so that 300 volts will be applied to the armature 7. By making direct connection of the armature 7 to the mains 4, 6 it will receive the same electromotive force and will cut the controlling means out of circuit. A further increase of speed may next be obtained by connecting the armatures 10 and 7 as before in series across the mains 4, 6, and by reversing and gradually increasing the field 11 a maximum of 350 volts will be applied to the motor to be controlled. In some cases it will be desired to further increase the speed by weakening the field 8 of the motor controlled by means of the rheostat 9. Also if the torque is light, increased speed may be obtained by weakening the field of motor 13, by means of the field rheostat 14.

It will be understood that during the operation above described the motor 13 and the variable source of electromotive force each operate sometimes as a motor and sometimes as a generator. It will also be seen that when the armatures 10 and 7 are connected in a local loop, a reversed electromotive force may be applied to armature 7 by reversing the field 11, which will give a reversed rotation of the motor. It will also be understood that the direction of rotation of the motor controlled may be reversed under the conditions of operation above described, either by reversing its armature or field connections.

With the preceding assumptions as to voltages, the same speed of the motor could be obtained by different connections, for example, when the armature 7 was connected directly between the mains 4, 5 the speed was practically the same as when the armature 7 was connected in series with armature 10 between the mains 4, 5 and when the field 11 had zero strength. Also when the armatures 10 and 7 were connected in series across mains 4, 5 with the field 11 having its full strength and the armature 10 generating counter volts, the speed was the same substantially as when the armatures 10 and 7 were connected in a local loop and the field 11 has its full strength. I therefore in some cases prefer to make the maximum voltage of armature 10 less than 50 volts so that in passing through the successive steps an increased speed will result in each case and the advantage is also secured that the capacity of the variable source of electromotive force is somewhat reduced.

Although the above mode of operation may be obtained by the apparatus described with reference to Fig. 1, it is of course desirable in practice to preferably attain the result by means of a single operating handle, lever or other controlling means. This result may be obtained by a controlling switch of the drum type in which a set of stationary fingers engage contacts upon a rotatable drum or cylinder, which contacts are suitably insulated and interconnected. In this type of switch it will be in some cases desirable to make the movement quick acting, introduce a multiplicity of breaks when the circuits are interrupted, provide means to minimize the objectionable effects of arcing, such as by providing a magnetic blow-out; provide means to emphasize desirable running points, such as the star wheel; and to otherwise improve the construction and operation. These however, form no part of my invention and as such constructions are now well understood, it is unnecessary to illustrate the detailed construction.

In Fig. 2 I have diagrammatically indicated the connections to the fingers and the development of the drum contacts to secure the results above described with reference to Fig. 1, by means of a single controlling means. On line 23 of Fig. 2 are indicated a series of contacts representing the fixed contacts of the controlling switch and they are designated by the same reference characters as used in Fig. 1. In addition are contacts 24, 25, 26, 27 with intervening rheostat contacts, and contact 28. These are for controlling the direction and strength of the field 11, and if desired an additional rheostat 29 may be used in the field circuit to secure finer gradations of electromotive force control than is secured by the drum contacts. When the switch is moved so that contact of the fingers is made on line 30, the armatures 10 and 7 will be connected in a local loop and resistance will be inserted in the circuit of field 11 so that its strength is weak. This will give a low electromotive force applied to the armature 7 and consequently a low speed. Further movement of the switch will cut out resistance from the circuit of field 11 and the electromotive force is thereby increased. At position 30$^a$, the armatures will be connected in series between the mains 4, 5 and the electromotive force of armature 10 will be counter to the line, as above described with reference to Fig. 1. By further movement, field 11 is weakened so that the electromotive force applied to the motor gradually approaches that between the mains 4, 5. At position 30$^b$ the armature 7 is connected directly across the mains 4, 5. At position 30$^c$ the armatures are connected as in position 30$^a$, but the field 11 is reversed. With these connections, the further movement of the controlling switch will cut out resistance in the circuit of field 11, and the electromotive force generated by armature 10 will be added to that across the mains 4, 5 thus increasing the electromotive force supplied to the motor controlled. At position 30$^d$ the armatures are connected in series across the mains 5, 6 and armature 10 is connected so that its electromotive force is counter to that of the line. Further movement of the switch inserts resistance in the field 11, thus decreasing the counter volts of armature 10 and causing the electromotive force supplied to the armature 7 to approach that between the mains 5, 6. At position 30$^e$, armature 7 is connected directly across the mains 5, 6. At position 30$^f$, the motor armatures are connected in series across the mains 5, 6 as in position 30$^d$, but the field 11 is reversed. As the field 11 is strengthened, the increasing electromotive force of armature 10 is added to that between the mains 5, 6. At position 30$^g$, the motor armatures are connected in series across the mains 4, 6 and the electromotive force generated by armature 10 is counter to that of the supply mains. Further movement of the switch will insert resistance in the circuit of field 11 which will decrease the counter volts. At position 30$^h$ the armature 7 is connected directly across the mains 4, 6. At position 30$^i$, the armature connections are the same as at position 30$^g$, but the field 11 is reversed, and as the resistance in the circuit is gradually cut out, the electromotive force applied to the armature 7 will be boosted to the electromotive force between the mains 4, 6 plus the full electromotive force of armature 10. It is therefore apparent that with this controlling switch the same sequence of connections is made and the mode of operation carried out as above described with reference to Fig. 1. It is obvious that the contacts of this switch may be arranged in various ways to secure the sequence of connections above described. If it is desired to reverse the rotation of the motor, the controlling switch will be moved from off position so that the fingers make contact on line 30$^j$. In this position the armatures 10 and 7 are connected on a local loop but the field of armature 10 is reversed with reference to its condition at position 30. A reversed electromotive force is therefore applied to armature 7 and when the controlling switch is moved to cut out the field resistance, the reversed electromotive force is increased to the full electromotive force of armature 10. In many cases this comparatively slow reverse movement will be all that is desired. When it is desired to control the motor to its full speed in a reverse direction, the reversing switch 31 in the circuit of armature 7 may be thrown and the controlling switch will then be turned as above described, giving the same graduations of speed in the reverse direction. It is preferable to interlock the reversing switch, such as the switch 9 in the circuit of the field 8, if the latter reversing switch is used, with the main controlling switch.

In Fig. 3 I have indicated one form of interlocking device. The operating handle of the main controlling switch is indicated at 32, and the operating handle of the reversing switch in the field or armature circuit of the motor controlled is indicated at 33. On the shaft of the main controlling switch is fixed a plate 34 having a recess in which one end of the pin or plunger 35 may seat. The shaft of the reversing switch, which is assumed to be of the drum type, carries a plate 36 having recesses 37 against which the pin 35 is normally pressed by a spring 38. When the reversing switch is in the open circuit position such as indicated, the pin 35 is pushed by the plate 36 and seats in the recess of the plate 34 thus locking the latter. In operation the reversing switch must first be thrown to one or the other closed circuit positions. The pin 35 is then forced into one of the recesses 37 by the spring 38 and the main switch may then be moved. If it is desired to reverse the direction of rotation of the motor, the main switch must be turned to its off position before the reversing switch can be changed. In the off position of the main switch, the recess in the plate 34 is opposite the pin 35 which will permit the latter to be moved into this recess when the reversing switch is operated, otherwise the pin 35 is prevented from movement by the edge of the plate 34. Although I have described a form of mechanical interlock, an electrical interlock could be used in its place.

It may be desired in some instances to obtain forward and reverse operation of the motor controlled to the maximum speed in each direction by operating a single controlling handle or lever. In such a case a controller could be used of the type described with reference to Fig. 2 with the addition of another set of contacts on the drum, and in which additional set of contacts the connections of the contacts engaged by the terminals of armature 7 would be reversed.

My invention is applicable to many forms of supply systems, and in Fig. 4 I have indicated the usual three-wire system in which the voltage between the neutral and each of the outside wires is the same and is indicated as 100 volts in the figure. The maximum electromotive force of the variable source of electromotive force required in this case would be 50 volts, and the mode of operation would be similar to that already described except that less range of speed is obtained.

In Fig. 5, there is indicated the common three-wire system assumed to have a difference of 100 volts between the neutral and each of the outside wires. In addition thereto is shown a motor generator 39 which generates 50 volts, and is connected to the supply line 4 and to an auxiliary supply line 40. The potentials of the four supply mains may therefore be assumed to be 0', 50', 150' and 250'. A battery 41 is connected between the mains 4 and 40 to assist the motor generator 39 to maintain the potential difference of 50 volts and thus permit the capacity of the motor generator to be reduced. With this arrangement the maximum electromotive force of the variable source need not exceed 25 volts. The mode of operation of the apparatus shown in Fig. 5 is similar in general to that described with reference to Fig. 1, and with reference to the particular form shown in Fig. 5 the operation may be briefly described as follows: With the field 11 at zero strength, the switches 15, 16, 17, 18 are moved so the armatures 10 and 7 are closed upon a local loop. The field 11 is then increased, giving 25 volts upon the armature 7. Armatures 10 and 7 are then connected in series across the mains 40 and 4 with the electromotive force of armature 10 counter to that of the mains 40, 4, after which the field 11 is gradually reduced. Direct connection of armature 7 may then be made across the mains 40, 4. With the same former series connection of the armatures between mains 40, 4 the field 11 will be built up in the reverse direction. The motor armatures are then connected across the mains 4, 5 with the full voltage of the armature 10 counter to that of the mains 4, 5, after which the strength of field 11 is reduced and direct connection of the armature 7 may be made across the mains 4, 5. The same series connection of the armatures may then again be made between mains 4, 5 and the field 11 built up in the reverse direction giving a total of 125 volts applied to armature 7. The next connection is a series connection of the motors between the mains 40, 5 with the armature 10 counter to the line electromotive force, and by weakening the field strength of the armature 10, the electromotive force applied to armature 7 may be made that between the mains 40, 5, or 150 volts. Direct connection of the armature 7 across the mains 40, 5 may then be made. By again making the same series connection of the armatures between the mains 40, 5 and by reversing and increasing the strength of field 11, the volts applied to the armature of the motor will be increased to 175 volts. The motor armatures will next be connected in series across the mains 4, 6 with the armature 10 such that it opposes the line electromotive force, and by decreasing its field strength the volts applied to the motor armature will approach 200. This same voltage will be applied to the motor armature by direct connection of its terminals to the mains 4, 6. With the same series connection of the motor armatures across the mains 4, 6 and by reversing and gradually building up the field 11, the voltage applied to the motor will be increased to 225 volts. The armatures may then be connected in series between the mains 40, 6 with the electromotive force of armature 10 opposing that of the line. Decreasing the strength of field 11 will increase the voltage applied to the motor to 250 volts, and this voltage on the motor may also be obtained by direct connection of the armature 7 across the mains 40, 6. The condition for maximum speed can now be reached by making the same series connection of the armatures across the mains 40, 6 and by reversing and gradually increasing the strength of field 11, giving a final voltage of 275.

In Fig. 6 there is indicated a distant source supplying energy to three-wire mains with a potential difference of 100 volts between the neutral and each of the outside conductors. There is also indicated a five-wire supply system derived from this source by means of a set of balancers 42 mounted on the same shaft and serving to maintain constant potentials on the intermediate conductors 43, 44. In this instance I have assumed that the potentials maintained on the different supply mains 4, 43, 5, 44 and 6 is 0', 33', 100', 133' and 200'. With this system the maximum electromotive force of the variable source need not exceed $16\frac{1}{2}$ volts. The operation of the apparatus of this figure, to secure a gradual change of electromotive force from zero to $216\frac{1}{2}$, is similar in general to the method already described, and it need only be stated that the procedure of operation is to pass from the local loop to a connection between the mains 4, 43, then to connections between the mains 43, 5, then between mains 4, 5, then between mains 4, 44, then mains 43, 6, and finally mains 4, 6. It will be understood that the intermediate steps and changes of connections correspond in general with those previously described.

In Fig. 7 there is shown a battery 45 connected between the outside supply mains 4, 6, and intermediate conductors 46, 47 extend from the battery from such points as to give potentials corresponding to 0', 40', 160', and 240' as indicated, it being assumed that the source of supply is a 240 volt source. It will be noted that the high voltage difference of 120 volts is between the two intermediate conductors. With this system the variable source may generate 20 volts and the mode of operation is similar to that previously described and after connecting the motors in the local loop they will be connected between mains 4, 46, then between mains 47, 6, then between mains 46, 47, then mains 4, 47, then mains 46, 6, and finally mains 4, 6.

In Fig. 8 I have indicated an alternating current source of energy 48 which may be single phase or polyphase and which is illustrated as single phase. I have also indicated a divided source of direct current energy derived therefrom by means of a motor generator 49 on the shaft of which are also fixed the revolving elements 50, 51 of dynamo electric machines which will maintain the desired potentials upon the mains 4, 46, 47, and 6, and which are designated as represented by 0', 40', 160', and 240', respectively, as in Fig. 7.

In Fig. 9 my invention is shown applied to a system in which alternating current is employed throughout. The original source is indicated at 48, supplying current to the static transformer 52, from the secondary winding of which extend four supply mains 53. The variable and reversible source of electromotive force may be any desired form of alternating current voltage controller and is indicated in this case as being of the induction type having the stationary part 54 and its winding connected across the outside supply mains and also having a movable part 55 with its winding connected to the switches 15, 16. The translating device 56, which may be an alternating current motor, is connected to the switches 17, 18. The mode of operation is similar in general to that above described, passing from the local loop connection to various connections between the supply mains and with the variable source sometimes acting with the electromotive force of the supply mains and sometimes counter thereto.

In Fig. 10 is indicated an alternating current high tension source 48, supplying energy to a static transformer 52 which lowers the electromotive force. From the transformer 52 connection is made to the rotary converter 57. A battery 58 is connected between the mains from the rotary 57 and acts to sub-divide the derived direct current electromotive force and maintain fixed potentials on the various supply mains, four being indicated in this figure.

In Fig. 11 is indicated a polyphase source of energy 59 and a motor generator supplied with energy therefrom. The motor generator comprises an alternating current motor 60 and a generator 61 which delivers direct current energy to the mains and I have indicated this generator as being of the type in which the outside mains are connected to the commutator and the neutral is maintained at an intermediate potential by any known method, for example by some special device, such as in the patent to Dobrowolsky, No. 513006. The intermediate conductor of the multiple voltage mains is therefore shown connected to a collector ring 62 adjacent to the commutator.

In Fig. 12 is indicated a source 63 of constant unidirectional current supplying the constant current to a circuit 64, in which a battery 65 is connected. Mains of different potential extend from this battery to give the various constant potentials required in practicing my invention.

In Fig. 13 I have indicated a source 66 of high tension alternating current energy which is supplied to the mains 67 of a railway system. Upon the vehicle 68 is indicated a static transformer 69 to reduce the high tension current taken from the line through moving contacts, and from the transformer 69, energy is transmitted to a rotary converter 70 receiving the alternating current at one end and giving direct current from the commutator to the outside supply mains. The intermediate conductor of the three-wire supply mains is connected to the collector ring 62, it being assumed that the converter is provided with some auxiliary means for maintaining the constant potential of the intermediate conductor. The controlling devices for controlling the driving motor or motors of the vehicle are indicated as being connected to the three-wire supply mains, and a drum controller is indicated at 71 which controller will form the sequence of connections and carry out the mode of operation as above described, such for example as with reference to Fig. 2.

In Fig. 14 is indicated a different means that might be employed for deriving divided direct current energy from an alternating current source. The source 66 of alternating current supplies energy to a rectifier 72 of approved type from which mains extend to the battery 58. From this battery extend the supply mains of different potential.

My invention will be of value in the operation of cranes. Such an application is indicated in Fig. 15, in which a source of direct current is indicated at 1, and from the supply mains 73, current is led to the crane indicated at 74. I have shown as mounted upon the crane a balancer set composed of three dynamo electric machines 75 from which extend four multiple voltage mains. In the operation of a crane of this type, three motors are usually employed, one for moving the crane as a whole, another for moving a traveling part cross-wise, and the third for hoisting and lowering. In the figure I have indicated three regulating and driving sets 76, each operated from the four multiple voltage conductors, and for each of these sets is indicated a controller 71. By means of these three controllers, each of the driving motors may be controlled in accordance with my invention and as already described.

Instead of controlling the apparatus directly by hand control, I may introduce intermediate automatic means, and also secure control from a distant point. Such an arrangement is necessary where the operator is at a considerable distance from the apparatus, for example, when my invention is applied to the operation of elevators. It is also important in many cases to simultaneously control a plurality of motors by means of a single controlling device and to control the same motor from a number of points, such as in the operation of trains. Fig. 16 illustrates diagrammatically apparatus by which these requirements are fulfilled. In this figure the parts similarly numbered correspond to the same parts in previous figures. In the present figure the leads from the armatures 7, 10 are connected to contacts of automatic switches 77, 78, 79, and 80. These switches are closed by the action of coils 81, which when excited, raise their cores and close the switches. The connections of switches 77 to 80 are such that when any one is closed a desired relation of the armatures 7, 10 to each other and to the mains 4, 5, 6 is secured. In the figure are shown a set of contacts on line 82 and the development of contacts on the drum of a controlling switch, which contacts are adapted to be engaged by those on line 82 when the controlling drum is operated. This controlling switch may be located at any desired different point, and is adapted to control the circuits of the coils 81 and also the direction and strength of the field 11 of the variable source of electromotive force and of the field 8 of the motor controlled. The contacts on line 82 beginning at the top and going down are connected as follows: Contact $83^a$ is connected to main 4, contact $83^b$ is connected to one terminal of each of the coils 81, contact $83^c$ is connected to the remaining terminal of coil 81 of the switch 77, contact $83^d$ is connected to the remaining terminal of coil 81 of the switch 78, contact $83^e$ is connected to the remaining terminal of coil 81 of the switch 79, contact $83^f$ is connected to the remaining terminal of coil 81 of the switch 80, the next two contacts $83^g$ are connected to the main 6, contact $83^h$ is connected to a terminal of the circuit of field 11 and then follow a set of field resistance contacts, contact $83^i$ is connected to the other terminal of the circuit of field 11, the next two contacts $83^j$ are connected to the main 4, contact $83^k$ is connected to one terminal of the circuit of field 8 and then follow a set of resistance contacts, contact $83^m$ is connected to the remaining terminal of the circuit of field 8, and contact $83^n$ is connected to main 6.

I have shown the mains 84 to which the controlling devices and contacts 83 are connected as through conductors, so that any number of controlling devices may be connected to the conductors 84 and operated simultaneously by means of the single controlling switch just described. Also any number of controlling switches may be connected to the through mains 84 and control the devices from other points of control as desired. I have therefore indicated the mains 85, which are adapted to be connected to another controlling switch and I have also indicated the mains 86, 87 which are adapted to be connected to another set of devices and to the mains 4, 5, 6, these mains corresponding to the mains 85′, 86′ and 87′ respectively.

I will now describe the operation of the controlling switch shown, and it will be understood that the operation of additional switches will be the same and control additional devices in the same manner.

The switch is adapted to secure forward rotation of the motor controlled by movement in one direction, and to secure reversed rotation of the motor controlled by movement of the controlling switch in the opposite direction, and also to secure full speed of the motor in each direction. For forward operation it may be assumed that the controlling switch is moved from off position so that the contacts on line 82 engage the drum contacts on line $88^a$; connection is then made from main 4 to the coil of switch 77 and thence through the controlling switch to the main 6. This causes the automatic switch 77 to be closed, by which the armatures 10 and 7 are connected in a local loop. At the same time the circuit of field 11 is closed across the mains 4, 6 with resistance in its circuit. This causes the armature 10 to generate a low electromotive force which is supplied to the armature 7. The field of the armature 7 is fully excited by movement of the controlling switch at this time, being connected across the mains 4, 6 and without resistance in its field circuit. Movement of the controlling switch will cause the resistance in the circuit of field 11 to be gradually cut out and thus increase the electromotive force supplied by armature 10 to the armature 7. When contact is made on line $88^b$, the field connection will be unchanged but the coil of switch 77 will be deënergized and the coil of switch 78 will be energized. Switch 77 will therefore be opened, and switch 78 will be closed. The closing of this switch causes the armatures 10 and 7 to be connected in series across the mains 4, 5 so that the electromotive force of armature 10 opposes that of the mains 4, 5 as above described. Further movement of the controlling switch will weaken the field 11 by the insertion of resistance in its circuit. This causes the electromotive force applied to armature 7 to approach that between the mains 4, 5. When contact is made on line $88^c$, the connections of the circuit of field 11 are changed so that the armature 10 will generate a low reversed electromotive force, so that the resultant electromotive force applied to armature 7 will be equal to that between the mains 4, 5 plus that generated by armature 10. Further movement of the controlling switch gradually cuts out resistance from the circuit of field 11 so that the electromotive force of armature 10 and consequently that of armature 7 is gradually increased. When contact is made on line $88^d$, the coil of switch 78 is deënergized, causing this switch to be opened and the coil of switch 79 is closed which will cause the switch 79 to be closed automatically. The connections of the contacts of switch 79 are such that the armatures 10 and 7 will be connected in series across the mains 5, 6, and the electromotive force of armature 10 will oppose that of the mains. Movement of the controlling switch will now insert resistance and weaken field 11, and as the counter volts of armature 10 gradually decrease, the electromotive force applied to armature 7 will gradually approach that between mains 5, 6. At position $88^e$, the field 11 is reversed causing the armature 10 to generate electromotive force in the same direction as that of the mains 5, 6, and as the switch is moved more this additive electromotive force is gradually increased. At position $88^f$, the coil of switch 79 is deënergized and the coil of switch 80 is closed, causing the closing of the automatic switch 80. The switch 80 will cause the armatures 10 and 7 to be connected in series across the mains 4, 6, so that the electromotive force of armature 10 is counter to that of the mains. Further movement of the controlling switch will insert resistance in the circuit of field 11 and cause the counter volts of armature 10 to be gradually decreased. At position $88^g$, the field 11 is reversed which will cause the armature 10 to act with the line electromotive force, and when the switch is moved farther the volts applied to the motor controlled will be gradually increased to the voltage of the outside mains plus the full voltage of the armature 10. Further movement will cause the field 8 of the motor controlled to be weakened by inserting resistance gradually in the field circuit, giving full speed forward. When the controller is turned back to the off position the same connections will of course be made in the reverse order. When the controller is moved from off position so that the contacts are on line $88^h$, reverse rotation of the motor controlled will result owing to the field connections of the motor being reversed at the controlling switch. The connections made in this position $88^h$ are otherwise the same as those made in position $88^a$, the armatures 10, 7 being connected in a local loop by the switch 77. Continued movement of the controlling switch in the reverse direction will secure the same sequence of connections as described with reference to the movement of the switch to secure forward rotation, as in passing through the successive positions $88^a$ to $88^g$, the only difference being that the field circuit of the motor controlled is reversed. Thus a single controlling switch secures forward and reverse rotation of the driven motor to full speed in each direction. Also with a switch of this type, the currents flowing through the same are very small and the size of conducting wires and other parts is very greatly reduced so that only a comparatively small controlling switch is required. It is evident that this switch may be any desired distance from the apparatus controlled, that it will control similar apparatus which may be connected to the mains 84, and that other similar switches may be connected to the mains 84 at other points and control the same apparatus.

In some cases it will be desired to have the action of the switches entirely automatic so that when a circuit is closed by a switch the sets of solenoid switches will be operated automatically to bring the motor controlled gradually to its full speed, and also to bring the motor gradually to rest automatically when another circuit is closed or the circuit first referred to opened. The automatic action of the switches in such cases will preferably be made to depend upon the counter electromotive force of the motor controlled, and in carrying this into effect the invention described in my pending application Serial No. 236,439 filed December 12, 1904 may be employed.

Instead of operating the controlling switch of Fig. 16 by hand, it will sometimes be desirable to operate this by a small pilot motor, which pilot motor may be controlled in either direction by simply throwing a double throw switch to one closed position or the other. Such an arrangement is shown in Fig. 17 in which the controlling switch of Fig. 16 with the wires leading thereto is shown at 89. This has a gear mounted on its shaft and in engagement with the gear is indicated a worm driven by the armature 90 of the pilot motor. The field 91 of this pilot motor has its circuit connected to give constant strength under normal conditions, although its strength may be adjusted by a rheostat in its circuit to give a desired strength. A circuit to the armature 90 which extends from some constant potential source, includes a double throw reversing switch 92 and an adjustable resistance to determine the current flow. The switch 92 will cause the motor controlling the switch 89 to operate in one direction when closed one way and in the reverse direction when closed the other way so that any desired position of the switch 89 can be secured and thus operate the driven motor at any speed or in any direction desired. If desired the switch 92 for the pilot motor may be made a regulating switch having resistances to control the speed of the pilot motor. I prefer to insert some protective means in the circuit of the pilot motor so that if the driven motor is subjected to a too rapid variation on electromotive force, the pilot motor will be automatically stopped and prevent any further change of the controlling switch 89 until normal conditions are restored. This result is accomplished by the insertion of a switch 93 in the armature circuit of the pilot motor which switch is automatically controlled by the core 94 of a solenoid 95, which solenoid is in series with the armature of the driven motor. If the current in the armature circuit of the driven motor becomes excessive by reason of a too rapid movement of the controlling switch, the core 94 will be raised and open the switch 93 and thus automatically stop the pilot motor. When the current in the armature circuit of the driven motor decreases to a normal amount, the core 94 will be moved downward and permit the switch 93 to close and the pilot motor may then continue to operate.

In Fig. 18 I have illustrated an application of my invention to the control of an elevator. The supply system and controlling devices are similar to those shown in Fig. 2 and it is assumed that the drum controlling switch 71 is like that shown in Fig. 2. In the present figure the armature 7 is shown as driving the drum 96 which controls the movement of the car 97 through suitable cables and guide wheels. The controlling switch 71 is shown as driven by a pilot motor, the armature 90 of which is controlled by switches in the car. The circuit of the armature 7 of the driving motor is also controlled from the car so as to determine the direction of current flow through the armature 7 and thus its direction of rotation. In the car are shown two similar switches 98, 98' adapted to be thrown by hand. These switches directly control the circuit of the armature 90 of the pilot motor, causing the current from the source to pass through the armature 90 in one direction or the other. If either of the switches 98, 98' is thrown upward, current will pass through the armature 90 in one direction and rotation of the pilot motor in one direction will result, turning the controlling switch 71 in such a direction as to cause the driven motor to operate at say increased speeds. If either of the switches 98, 98' are moved downward, current will flow through the armature 90 in the reverse direction and cause the controlling switch 71 to be moved so as to give decreased speeds of the driven motor. There is a third reversing switch 99 which is controlled by each of the switches 98, 98'. The switch 99 controls the direction of currents in the circuit of armature 7. The switches 98, 98' each carry a plate having a recess 100, and the ends of a pin 101 are adapted to seat in these recesses. The pin 101 is connected to and throws the pivoted arm of the switch 99, causing it to engage one or the other pair of contacts. If it be assumed that the switch 98 is thrown upward the pin 101 is forced into the recess of the switch 98'. This will lock the latter switch in position and it cannot be moved until the switch 98 is returned to open position. The throwing of the pin 101 causes the connections of the armature 7 to be such that rotation thereof in one direction is secured. The switch 98, when thrown upward as assumed, causes the pilot motor to rotate in such a position as to drive the controlling switch so that an increase in speed of the driven motor is secured. If it is desired to decrease the speed of the driven motor the switch 98 is thrown downward which reverses the pilot motor causing the controlling switch to be moved backward toward its off position. When it is desired to reverse the direction of rotation of the driven motor, the switch 98 is opened after the car or driven motor has come to a stop and the switch 98' is then thrown upward.
This causes the switch 99 to be thrown so as to reverse the direction of current through armature 7 and also causes the pilot motor to rotate in such a direction as to move the main controlling switch to give increased speeds of the driven motor. Downward movement of switch 98' will reverse the rotation of the pilot motor and therefore cause the speed of the driven motor and consequently of the car to be gradually decreased.
Although I have shown the connection of switch 99 such that the current through armature 7 is reversed by its movement, it will be understood that the field circuit 8 could be reversed by this switch if desired instead of the armature circuit.

Although my invention is specially well adapted for the control of the speed of a motor without the insertion of resistances in the armature circuit, the conditions may be such in some cases as to make the use of such resistances advantageous, for example where there would otherwise be a considerable jump in voltage.

In Fig. 19 are shown supply mains 4, 5, 6, the potentials of which are assumed to be 0', 100' and 400'. The electromotive force of armature 10 at its maximum may be 50 volts and by carrying out the method described with reference to Fig. 1, a gradual increase of voltage may be obtained from the minimum up to 150 volts when the armatures 10, 7 will be connected in series across the mains 4, 5 and the electromotive force of armature 10 will be added to that of the mains. But in the next step when the armatures are connected in series across the mains 5, 6, with the counter volts of armature 10 opposing that between the mains 5, 6 there would be a jump to 250
volts. In this case it would be desirable to first insert a resistance in series with the armatures which would be gradually cut out or entirely cut out before the counter volts of the armature 10 were reduced. I have therefore indicated a set of resistance contacts 102 for the switch 18 so that when the armatures are connected across the mains 5, 6 a resistance will be included and afterward cut out by further movement of switch 18. The operation of the devices of Fig. 19 would otherwise be similar to those of Fig. 1.

It will be noted that when the translating device controlled is an electric motor, as in the above illustrations, the motor armature is always generating counter electromotive force and when the armatures 10, and 7 are connected in series across the supply mains, there will be three electromotive forces in the circuit in various relations.

Instead of using a dynamo electric machine for securing the variable and reversible electromotive force other types of apparatus may be used, for example, circuit interrupters adapted to vary the voltage. Also other means for maintaining the required potentials on the multiple voltage mains other than those already described may be used.

Fig. 20 indicates a railway system in which there is a single phase source of supply at 66, to which the conductors 67 are connected. The high tension current is led upon the car 68 and the voltage is reduced on the car by means of a static transformer 103. In order to maintain the required potentials upon the multiple voltage mains, rotary converters may be used as has previously been referred to. In the present figure I have indicated rectifiers for transforming the alternating current, and for producing the electromotive forces maintained on the four multiple voltage mains which are designated as 4, 46, 47, and 6, and are indicated as having potentials 0', 40', 160' and 240'. These potentials correspond to those indicated in Figs. 7 and 8, and are in a desirable ratio to each other, but of course any other desired potentials may be adopted.

There are various different forms of rectifiers adapted for use in connection with my invention. One form is diagrammatically indicated in Fig. 21. This consists of a laminated iron core 104 and has two opposite quarters wound with turns 105, as in the Gramme ring winding, the coils being connected to segments 106. Between the two sets of segments 106 are located two large segments 107, each of which occupy a quarter of the circumference, and which are also connected to the turns 105 as shown. Upon the commutator made up of the segments 106, 107, bear two brushes 108, which collect a uni-directional current and supply it to the mains leading therefrom. Within the commutator are shown two collector rings 109, one of which is connected to the upper segment 107, and the other to the lower segment 107. The brushes 110, which bear upon the rings 109, are connected to a single phase alternating current source by means of the mains 111, and 111'. In operation, the upper segment 107 and the adjoining halves of segments 106 will have always the same polarity as that of main 111, whereas the lower segment 107 and the adjoining halves of segments 106 will always have the polarity of main 111'. The device must be driven at synchronous speed, and at the position illustrated, that is, when the brushes 108 are in mid-position on segments 107, the alternating current wave will have its maximum value, say in a positive direction. When the device has rotated a quarter of a revolution, the direction of the alternating current changes, but at the same time the brushes 108 pass on to parts of the commutator which result in maintaining a uni-directional current on the circuit leading from brushes 108. The uni-directional current obtained is of a pulsating character, but the self induction of the circuit tends to make the current more uniform. It will be seen that there is always a closed circuit through the device, the coils 105 acting as coils of considerable self-induction. It will further be understood that the value of the electromotive force derived from the brushes 108 may be gradually varied if one brush is moved toward the other, giving any desired electromotive force, and by moving both brushes, the direction of the uni-directional current in the circuit may be reversed. It will also be understood that instead of using a commutator as shown, which requires that the apparatus must make one revolution for each complete cycle of the alternating current, a commutator may be used having additional brushes and segments 180 electrical degrees apart, as in the spacing of brushes of multi-polar machines, and the sets of coils 105 being correspondingly spaced upon the ring 180 electrical degrees apart.

Referring to Fig. 20 again, I have shown a synchronous motor 112 supplied with energy from the secondary of the transformer 103. On the shaft of the synchronous machine 112 are mounted three rectifiers 113 of the type described with reference to Fig. 21. The brushes bearing upon the collector rings of these rectifiers are connected to taps from the secondary of transformer 103, which taps are connected to turns in the ratio of that desired upon the multiple voltage mains 4, 46, 47, and 6. From the commutators of the rectifiers 113 extend the multiple voltage mains connected as shown. The electromotive force of the uni-directional current derived from the rectifiers is, of course, proportional to that supplied to the rectifiers, assuming that the brushes 108 are, in each case, placed so as to deliver maximum electromotive force. Although I have shown the rectifiers 113 connected to taps from the secondary of the transformer 103, it may sometimes be desirable to use an auto-transformer. Other parts of the apparatus are similar to those shown and described with reference to Fig. 7, and the mode of operation will be as already described with reference to that figure. The controller 114 is adapted to carry out the sequence of connections required.

Instead of varying the field 11 by means of resistances in its circuit, as has been before described, I may sometimes use a separate exciter in the form of a generator such as indicated at 115. This is shown mounted on the shaft of the motor 13, and thus rotates at a substantially constant speed, the electromotive force delivered by the armature 116 being varied and reversed by varying and reversing the field thereof. The leads from the field of the generator 115 are shown as connected to the controller 114, which controls the field strength by varying resistances. It will be understood from the description of the rectifier with reference to Fig. 21 that such a device may be used as the variable source of electromotive force in place of the dynamo 10, 11, the variable and reversible electromotive force being obtained by shifting the position of brushes 108.

An advantage of my invention, which advantage is especially important with regard to the application to railway systems or motor vehicles, is the regeneration of energy by the motors controlled. When the controlling switch or switches are operated to reduce the electromotive force applied to the motor or motors, and thus lower their speed, the motors then act as generators and return energy to the source or sources. This regeneration of energy places a greater or less load upon the motors depending upon conditions and thus produces a braking action which retards the motors. By proper manipulation of the controlling switches, the regeneration of energy may be made to bring the motors to full rest. In railway systems and motor vehicles, the energy restored in stopping and in descending hills may be a very considerable amount.

It will be understood that various auxiliary and protective devices will be desired and preferably used in connection with my present invention, for example, overload and no-voltage and other protective devices.

These are not disclosed however, as their application is well understood.

Having thus described my invention, I declare that what I claim as new and desire to secure by Letters Patent, is:—

1. The combination of a divided electromotive force source of energy, multiple voltage mains therefrom, a translating device, an electromotive force producer, and means for connecting said device and producer in series across different pairs of said multiple voltage mains so that the electromotive force of the producer is sometimes added to that of the source and sometimes counter to that of the source.

2. The combination of a plurality of sources of electromotive force having electromotive forces different in value from each other, electro-dynamic means for producing a variable and controllable electromotive force, an electric motor, and means for combining the said electro-dynamic means with each of said sources of electromotive force for controlling the motor.

3. The combination of a divided electromotive force source of energy, multiple voltage mains extending therefrom, a second source of electromotive force, a translating device, and means for connecting said second source and said device in series across one pair of said mains so that the electromotive force of said second source opposes that of said first source and also so that it acts with said first source, and afterward connecting said second source and said device in series across another pair of said supply mains so that said second source opposes said first source and also so that it acts with said first source and thus cause a gradually increasing electromotive force to be applied to said device.

4. The combination of a source of electromotive force, multiple voltage mains extending therefrom, a second source of electromotive force, a translating device, and means for connecting said second source and said device in series across one pair of said mains so that the electromotive force of said second source opposes that of said first source and also so that it acts with said first source, and afterward connecting said second source and said device in series across another pair of said supply mains so that said second source opposes said first source and also so that it acts with said first source and by intermediate variations of the electromotive force of said second source thus cause a gradually increasing electromotive force to be applied to said device.

5. The combination of a source of electromotive force and multiple voltage mains extending therefrom, a second source of electromotive force, a translating device, and controlling means which by its movement connects said second source and said device in series across a pair of said mains so that the electromotive force of said second source opposes that of said first source, then decreases the electromotive force of said second source, then causes the electromotive force of said second source to act with said first source, then increases the electromotive force of said second source, then connects said second source and said device in series across another pair of said mains so that the electromotive force of said second source opposes that of said first source and then decreases the electromotive force of said second source to increase the electromotive force applied to said device.

6. The combination of a source of electromotive force and multiple voltage mains extending therefrom, a second source of electromotive force, a translating device, and controlling means which by its movement connects said second source directly in a local loop with said device, then connects said second source in series with said device across a pair of said mains so that the electromotive force of said second source opposes that of said first source and so that it afterward acts with said first source, and then connects said second source in series with said device across another pair of said mains so that the electromotive force of said second source opposes that of said first source.

7. The combination of a source of electromotive force and multiple voltage mains extending therefrom, a second source of electromotive force, a translating device, and controlling means which by its movement connects said second source directly in a local loop with said device, then connects said second source in series with said device across a pair of said mains so that the electromotive force of said second source opposes that of said first source and so that it afterward acts with said first source, and then connects said second source in series with said device across another pair of said mains so that the electromotive force of said second source opposes that of said first source and so that it afterward acts with said first source.

8. The combination of a source of electromotive force and multiple voltage mains extending therefrom, a second source of electromotive force, a translating device, and controlling means which by its movement connects said second source directly in a local loop with said device, then increases the electromotive force of said second source, then connects said second source in series with said device across a pair of said mains so that the electromotive force of said second source opposes that of said first source, then decreases the electromotive force of said second source, then connects said second source in series with said device across said pair of mains so that the electromotive force of said second source acts with that of said first source, then increases the electromotive force of said second source, then connects said second source in series with said device across another pair of said mains so that the electromotive force of said second source opposes that of said first source, and then decreases the electromotive force of said second source.

9. The method of controlling the electromotive force applied to a translating device, which consists in applying to said device an electromotive force from one source, then connecting said source in opposition to a second source and applying the resultant of said combination to said device, then causing said first source to act with said second source, and then opposing said first source to a different electromotive force and applying the resultant to said device.

10. The method of controlling the electromotive force applied to a translating device which consists in applying to said device a gradually increasing electromotive force from a source, then connecting said source in opposition to a second source and applying the resultant to said device, then gradually reducing the electromotive force of said first source, then causing said electromotive force to act with said second source, then gradually increasing the electromotive force of said first source, then connecting said first source so as to be in opposition to another electromotive force of different value and then decreasing the electromotive force of said first source.

11. The method of controlling the electromotive force applied to a translating device which consists in applying to said device a gradually increasing electromotive force from a source, then connecting said source in opposition to a second source and applying the resultant to said device, then gradually reducing the electromotive force of said first source, then causing said electromotive force to act with said second source, then gradually increasing the electromotive force of said first source, then connecting said first source so as to be in opposition to another electromotive force of different value then decreasing the electromotive force of said first source, then causing said first source to act with said electromotive force of different value, and then increasing the electromotive force of said first source.

12. The combination of a plurality of sources of electromotive force having electromotive forces different in value from each other, electro-dynamic means for producing a variable and reversible electromotive force, an electric motor, and means for combining the said electro-dynamic means with each of said sources of electromotive force for controlling the motor.

13. The combination of an electric motor and means for gradually increasing the electromotive force upon the terminals of the armature of said motor from a desired minimum to a desired maximum, said means comprising two sources of fixed and different electromotive force, the electromotive force of each source being greater than the desired minimum and less than the desired maximum, and a controllable source of electromotive force adapted to be connected between each of said fixed sources and the said motor armature.

14. The combination of two electromagnetic sources of electromotive force, the electromotive forces of said sources being different in amount, a translating device to be supplied with variable electromotive forces, an electromagnetic device for producing a controllable electromotive force, and means for combining the said sources and said electromagnetic device with the said translating device so as to secure upon said translating device any desired electromotive force from a minimum less than that of either source to a maximum greater than that of either source.

15. The combination with a source of electric energy of means for unsymmetrically dividing the same so as to produce different electromotive forces, means comprising a winding producing by magnetic induction a variable electromotive force, an electric motor, and means for connecting the armature of said motor and said winding in series with each other and so as to be subjected to either or both of said different electromotive forces.

16. The combination of an unsymmetrically divided source of electromotive force, an electric motor supplied with energy therefrom, regulating means comprising a winding for producing by magnetic induction a variable and reversible electromotive force, and means for applying to at least one element of said motor the resultant electromotive force obtained by connecting the winding of said regulating means in series with each of the divisions of the said divided source.

17. The combination of a plurality of sources of electromotive force, the electromotive forces of which differ in amount, a device having a winding for producing a variable electromotive force, an electric motor, and means for combining the said winding of variable electromotive force with said sources so that the electromotive force of said winding acts counter to and accumulatively with reference to the electromotive forces of said sources and so produce upon at least one winding of said motor progressively increasing electromotive forces.

18. The method of controlling the electromotive force applied to a motor, which consists in subjecting the motor to the electromotive force of one source, then subjecting the motor to the resultant electromotive force of said source and the additive electromotive force of a variable source, and then subjecting the motor to a higher electromotive force of another source and the counter electromotive force of said variable source and thereby gradually increase the electromotive force applied to the motor.

19. The method of controlling an electric motor, which consists in developing a plurality of different electromotive forces and subjecting the motor directly to each of said electromotive forces, and subjecting the motor to intermediate electromotive forces by developing in series with the motor a variable and reversible electromotive force.

20. The combination of two sources of electromotive force, an electric motor having a field winding excited independently of the current through the motor armature, a controller operated by movement of a single device for combining the said sources in series with one element of said motor in different relations, a second controller operated by another single device for controlling the direction of current in one element of said motor, and means for protectively relating the movement of said two controllers.

21. The combination of two sources of electromotive force, an electric motor having a field winding excited independently of the current through the motor armature, a controller operated directly by a single handle for combining the said sources in series with one element of said motor in different relations, a second controller operated directly by another handle for controlling the direction of current in one element of said motor, and means for protectively relating the movement of said two controllers.

22. The combination of two sources of electromotive force, a translating device, and a controller operated by a single means for making and breaking the circuit and for connecting said sources in series with said device so that said sources oppose each other and connecting said sources in series with said device so that said sources act in the same direction and for also gradually varying the electromotive force of one of said sources.

23. The combination of a source of electromotive force, a source of variable electromotive force, an electric motor, a controller for making and breaking the circuit and for connecting said sources in series with the armature of said motor, for varying the electromotive force of said second source and for changing the circuit connections of said source of variable electromotive force with reference to said first named source, a second controller for reversing the circuit connections of a field winding of said motor for reversing the direction of rotation thereof, and means for protectively relating the movement of said two controllers.

24. The combination of a source of constant electromotive force, a source of variable electromotive force, an electric motor, a controller for changing the circuit relations of said sources to the armature winding of said motor, means for reversing the connections of a field winding of said motor, and means for protectively relating said controller and said reversing means.

25. The combination of a plurality of sources of approximately fixed electromotive force, a source of variable electromotive force, an electric motor, a controller for connecting said sources to a winding of said motor in various relations, a separate device for reversing the direction of movement of said motor, and means for protectively relating said controller and said device.

26. The combination of means for producing a divided electromotive force, an additional source of electromotive force, an electric motor, and a single controller having contacts for connecting said additional source and a winding of said motor in series with different divisions of said divided electromotive force and for reversing the connections of said additional source.

27. The method of controlling electric energy in a circuit containing a translating device, which consists in producing two unequal electromotive forces in series with each other, successively impressing each of such electromotive forces upon said circuit, and further controlling the energy in the circuit by a variable electromotive force applied to the circuit.

28. The combination of a multiple voltage system, the voltages betwen each successive pair of mains being different, a translating device, an auxiliary source of variable electromotive force, and means for connecting said translating device successively to the supply circuits of said multiple voltage system and to said auxiliary source jointly with said supply circuits.

29. A source of uni-directional current, two dynamo armatures of unequal voltage in series with each other across said source, multiple voltage mains leading therefrom, a separate dynamo having a field winding adapted to be separately excited from said multiple voltage mains, a non-reversible rheostat in series with said separately excited field winding, a single controller adapted when moved in one direction from neutral position to control the dynamo field and armature to obtain only a slow reverse speed and when moved from neutral position in the other direction to reverse the current of said dynamo field winding, and to combine said dynamo armature with different conductors of the multiple voltage system, whereby a high voltage is obtainable in one sense only with a low voltage in the reverse sense.

30. A source of uni-directional current, two dynamo armatures of unequal voltage connected in series across said source, supply conductors leading therefrom to form a multiple voltage system, a separate source of electromotive force, a motor armature, a controller having contacts adapted when moved in one direction to directly connect said motor armature with said separate source in a local loop and vary the electromotive force of said source and when moved in the other direction to first directly connect said motor armature to said source, and then to combine said source with the multiple voltage system, whereby the voltages of the multiple voltage system are applied to the motor armature only by movement in one direction and not by movement in the other direction.

In testimony whereof I affix my signature, in presence of two witnesses.

H. WARD LEONARD.

Witnesses:
L. K. SAGER,
GEO. A. HOFFMAN.

---

Copies of this patent may be obtained for five cents each, by addressing the "Commissioner of Patents, Washington, D. C."